United States Patent
Koga et al.

(10) Patent No.: US 12,231,824 B2
(45) Date of Patent: Feb. 18, 2025

(54) SYSTEMS AND METHODS FOR SPATIAL AWARENESS OF A REFUSE VEHICLE

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 534 days.

(21) Appl. No.: 17/232,608

(22) Filed: Apr. 16, 2021

(65) Prior Publication Data
US 2021/0323764 A1 Oct. 21, 2021

Related U.S. Application Data

(60) Provisional application No. 63/011,602, filed on Apr. 17, 2020.

(51) Int. Cl.
*H04N 9/31* (2006.01)
*B60Q 5/00* (2006.01)
*B60R 1/23* (2022.01)
*B65F 3/02* (2006.01)
(Continued)

(52) U.S. Cl.
CPC ........... *H04N 9/3147* (2013.01); *B60Q 5/006* (2013.01); *B60R 1/23* (2022.01); *B65F 3/04* (2013.01); *H04N 7/18* (2013.01); *B60Q 2400/50* (2013.01); *B60R 2300/802* (2013.01);
(Continued)

(58) Field of Classification Search
CPC ........ H04N 9/3147; H04N 7/18; H04N 7/181; B60R 1/23; B60R 2300/802; B60R 1/00; B60Q 5/006; B60Q 2400/50; B60Q 1/484; B60Q 1/525; B60Q 5/005; B65F 3/04; B65F 2003/0269; B65F 2003/0279; B65F 2210/165; B65F 2003/0266; B65F 3/08
See application file for complete search history.

(56) References Cited

U.S. PATENT DOCUMENTS

| 5,378,010 A | 1/1995 | Marino et al. |
| 6,105,984 A | 8/2000 | Schmitz et al. |
| 6,516,914 B1 | 2/2003 | Andersen et al. |

(Continued)

*Primary Examiner* — Aniss Chad
*Assistant Examiner* — Christopher George Fees
(74) *Attorney, Agent, or Firm* — Foley & Lardner LLP

(57) ABSTRACT

A vehicle includes an automated apparatus extending from the vehicle and a projection system. The projection system includes a projector positioned on the vehicle. The projector is configured to operate to provide a projection onto a ground surface, the projection covering a zone. The automated apparatus is configured to operate within the zone.

20 Claims, 8 Drawing Sheets

(51) Int. Cl.
*B65F 3/04* (2006.01)
*H04N 7/18* (2006.01)

(52) U.S. Cl.
CPC ............... *B65F 2003/0269* (2013.01); *B65F 2003/0279* (2013.01); *B65F 2210/165* (2013.01)

(56) References Cited

U.S. PATENT DOCUMENTS

| | | | |
|---|---|---|---|
| 6,757,597 B2 | 6/2004 | Yakes et al. | |
| 6,885,920 B2 | 4/2005 | Yakes et al. | |
| 7,164,977 B2 | 1/2007 | Yakes et al. | |
| 7,277,782 B2 | 10/2007 | Yakes et al. | |
| 7,302,320 B2 | 11/2007 | Nasr et al. | |
| 7,357,203 B2 | 4/2008 | Morrow et al. | |
| 7,379,797 B2 | 5/2008 | Nasr et al. | |
| 7,448,460 B2 | 11/2008 | Morrow et al. | |
| 7,520,354 B2 | 4/2009 | Morrow et al. | |
| 7,689,332 B2 | 3/2010 | Yakes et al. | |
| 7,711,460 B2 | 5/2010 | Yakes et al. | |
| 7,848,857 B2 | 12/2010 | Nasr et al. | |
| 7,931,103 B2 | 4/2011 | Morrow et al. | |
| 8,000,850 B2 | 8/2011 | Nasr et al. | |
| 8,139,109 B2 | 3/2012 | Schmiedel et al. | |
| 8,561,735 B2 | 10/2013 | Morrow et al. | |
| 8,947,531 B2 | 2/2015 | Fischer et al. | |
| 9,045,014 B1 | 6/2015 | Verhoff et al. | |
| 9,174,686 B1 | 11/2015 | Messina et al. | |
| 9,420,203 B2 | 8/2016 | Broggi et al. | |
| 9,656,640 B1 | 5/2017 | Verhoff et al. | |
| 9,707,869 B1 | 7/2017 | Messina et al. | |
| 9,981,803 B2 | 5/2018 | Davis et al. | |
| 10,101,189 B2 | 10/2018 | Demski | |
| D843,281 S | 3/2019 | Gander et al. | |
| 10,414,067 B2 | 9/2019 | Datema et al. | |
| 10,434,995 B2 | 10/2019 | Verhoff et al. | |
| D871,283 S | 12/2019 | Gander et al. | |
| 10,633,181 B2* | 4/2020 | Butcher | B65F 3/00 |
| D888,629 S | 6/2020 | Gander et al. | |
| 10,676,022 B2* | 6/2020 | Zevenbergen | G01C 21/20 |
| 10,800,605 B2 | 10/2020 | Rocholl et al. | |
| 10,843,379 B2 | 11/2020 | Rocholl et al. | |
| 10,859,167 B2 | 12/2020 | Jax et al. | |
| D907,544 S | 1/2021 | Wall et al. | |
| D909,934 S | 2/2021 | Gander et al. | |
| 10,987,829 B2 | 4/2021 | Datema et al. | |
| 10,997,802 B2 | 5/2021 | Koga et al. | |
| 11,001,135 B2 | 5/2021 | Yakes et al. | |
| 11,001,440 B2 | 5/2021 | Rocholl et al. | |
| 11,007,863 B2 | 5/2021 | Yakes et al. | |
| 11,459,215 B2* | 10/2022 | Wong | B60R 1/00 |
| 2014/0334169 A1* | 11/2014 | Ewert | A62C 27/00 362/485 |
| 2018/0044109 A1* | 2/2018 | Butcher | B65F 3/00 |
| 2019/0100198 A1* | 4/2019 | Hakki | B60Q 1/535 |
| 2019/0183697 A1* | 6/2019 | Salter | A61G 3/062 |
| 2019/0185077 A1 | 6/2019 | Smith et al. | |
| 2019/0315270 A1* | 10/2019 | Ly | B60Q 1/30 |
| 2019/0344475 A1 | 11/2019 | Datema et al. | |
| 2019/0351883 A1 | 11/2019 | Verhoff et al. | |
| 2020/0189455 A1* | 6/2020 | Berreur | B60Q 1/545 |
| 2020/0247609 A1* | 8/2020 | Maroney | B65F 3/04 |
| 2020/0262366 A1 | 8/2020 | Wildgrube et al. | |
| 2020/0265656 A1 | 8/2020 | Koga et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0348681 A1 | 11/2020 | Clifton et al. | |
| 2020/0348764 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0399058 A1 | 12/2020 | Rocholl et al. | |
| 2021/0031649 A1 | 2/2021 | Messina et al. | |
| 2021/0054942 A1 | 2/2021 | Jax et al. | |
| 2021/0069934 A1 | 3/2021 | Rocholl et al. | |
| 2021/0127544 A1* | 5/2021 | Ohrstrom | B60R 1/00 |
| 2021/0197846 A1* | 7/2021 | Thakur | G01S 17/931 |
| 2021/0261391 A1* | 8/2021 | Theos | B62D 15/021 |
| 2022/0348134 A1* | 11/2022 | Beernaert | B60Q 1/26 |

* cited by examiner

SYSTEMS AND METHODS FOR SPATIAL AWARENESS OF A REFUSE VEHICLE

CROSS-REFERENCE TO RELATED PATENT APPLICATION

This application claims the benefit of and priority to U.S. Provisional Application No. 63/011,602, filed Apr. 17, 2020, the entire disclosure of which is incorporated by reference herein.

BACKGROUND

The present disclosure relates to refuse vehicles. More particularly, the present disclosure relates to control systems for refuse vehicles.

SUMMARY

One embodiment of the present disclosure relates to a vehicle including an automated apparatus extending from the vehicle and a projection system. The projection system includes a projector positioned on the vehicle. The projector is configured to operate to provide a projection onto a ground surface, the projection covering a zone. The automated apparatus is configured to operate within the zone.

Another embodiment of the present disclosure relates to a projection system for a vehicle. The projection system includes a projector, and processing circuitry. The projector is coupled with the vehicle and positioned proximate an automated apparatus of the vehicle and configured to provide a projection onto a zone of a ground surface. The automated apparatus is configured to operate within the zone. The processing circuitry is configured to operate the projector to provide the projection onto the ground surface. The projection is configured to increase a conspicuity or visibility of the zone or the automated apparatus.

Another embodiment of the present disclosure relates to a method for increasing a conspicuity of an operating zone of an automated apparatus of a vehicle. The method includes receiving a user input to operate the automated apparatus. The method also includes operating a projector to provide a projection onto a ground surface nearby the vehicle. The projection covers a zone within which the automated apparatus operates. The method also includes operating the automated apparatus of the vehicle to perform a function within the zone.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a refuse vehicle can include a projection system. The projection system can include a camera, a controller, one or more projectors, and an aural alert device. The refuse vehicle can include various articulated arms, automated features, toters, refuse collection apparatuses, etc. The controller is configured to operate the one or more projectors to project an image, a light, a visual indication, etc., over an area where the automated features of the refuse vehicle may swing, translate, move, etc. In some embodiments, the projectors display, project, output, or otherwise provide their space claims onto a ground surface where the automated features, arms, apparatuses, etc., move. For example, the projectors can display a projected zone on the ground surface. The projection system can aid drivers or operators of the refuse vehicle in collection activities, arm clearance, toter alignment, and facilitate better clearance understanding or spatial awareness for various automated refuse vehicle features. In some embodiments, the controller of the projection system is configured to obtain image data from the camera and superimpose a visual representation of the projected zone onto the image data. The projection system can provide display data that includes both the image data obtained from the camera and the visual representation of the projected zone to a display screen so that an operator can view the display data.

Commercial Vehicle

Figure 1:
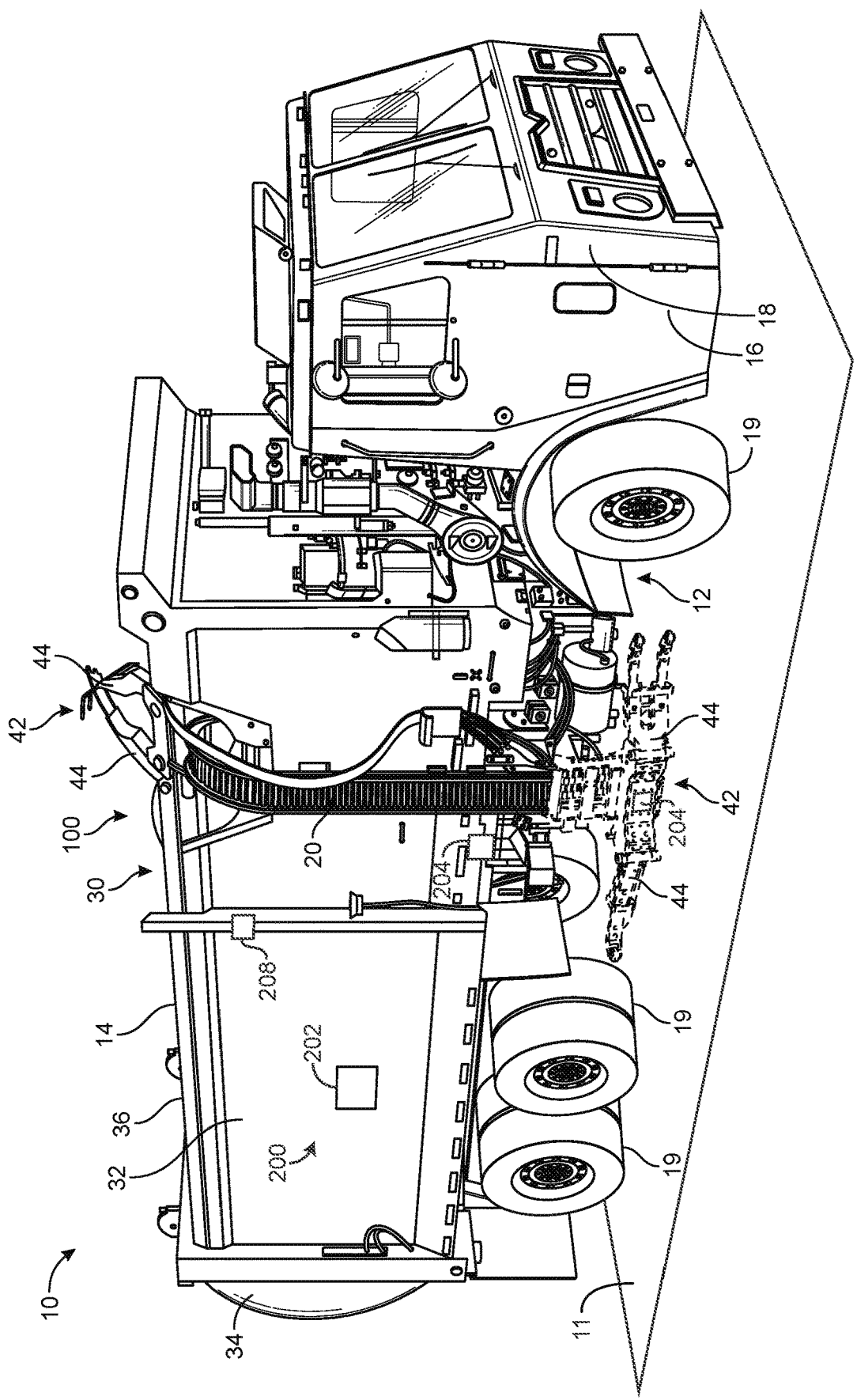
FIG. 1 is perspective view of a refuse vehicle including a projection or spatial awareness system, according to an exemplary embodiment.

According to the exemplary embodiment shown in FIG. 1, a vehicle, a truck, a commercial vehicle, a collection vehicle, etc., shown as refuse vehicle 10 (e.g., a garbage truck, a waste collection truck, a sanitation truck, a refuse collection truck, a refuse collection vehicle, etc.), is configured as a side-loading refuse truck having a first lift mechanism/system (e.g., a side-loading lift assembly, etc.), shown as lift assembly 100. In other embodiments, refuse vehicle 10 is configured as a front-loading refuse truck or a rear-loading refuse truck. In still other embodiments, the vehicle is another type of vehicle (e.g., a skid-loader, a telehandler, a plow truck, a boom lift, etc.).

As shown in FIG. 1, refuse vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of refuse vehicle 10 by an operator (e.g., a seat, a steering wheel, hydraulic controls, a user interface, switches, buttons, dials, etc.). As shown in FIG. 1, refuse vehicle 10 includes a prime mover, shown as engine 18, coupled to frame 12 at a position beneath cab 16. Engine 18 is configured to provide power to a plurality of tractive elements, shown as wheels 19, and/or to other systems of refuse vehicle 10 (e.g., a pneumatic system, a hydraulic system, an electric system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of refuse vehicle 10.

According to an exemplary embodiment, refuse vehicle 10 is configured to transport refuse from various waste receptacles within a municipality to a storage and/or processing facility (e.g., a landfill, an incineration facility, a recycling facility, etc.). As shown in FIG. 1, body 14 includes a plurality of panels, shown as panels 32, a tailgate 34, and a cover 36. Panels 32, tailgate 34, and cover 36 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. According to the embodiment shown in FIG. 1, body 14 and refuse compartment 30 are positioned behind cab 16. In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1, refuse vehicle 10 includes first lift mechanism/system (e.g., a front-loading lift assembly, etc.), shown as lift assembly 100. Lift assembly 100 includes a grabber assembly, a carrier assembly, etc., shown as grabber assembly 42, movably coupled to a track, shown as track 20, and configured to move along an entire length of track 20. According to the exemplary embodiment shown in FIG. 1, track 20 extends along substantially an entire height of body 14 and is configured to cause grabber assembly 42 to tilt near an upper height of body 14. In other embodiments, track 20 extends along substantially an entire height of body 14 on a rear side of body 14. Refuse vehicle 10 can also include a reach system or assembly coupled with a body or frame of refuse vehicle 10 and lift assembly 100. The reach system can include telescoping members, a scissors stack, etc., or any other configuration that can extend or retract to provide additional reach of grabber assembly 42 for refuse collection.

Figure 3:
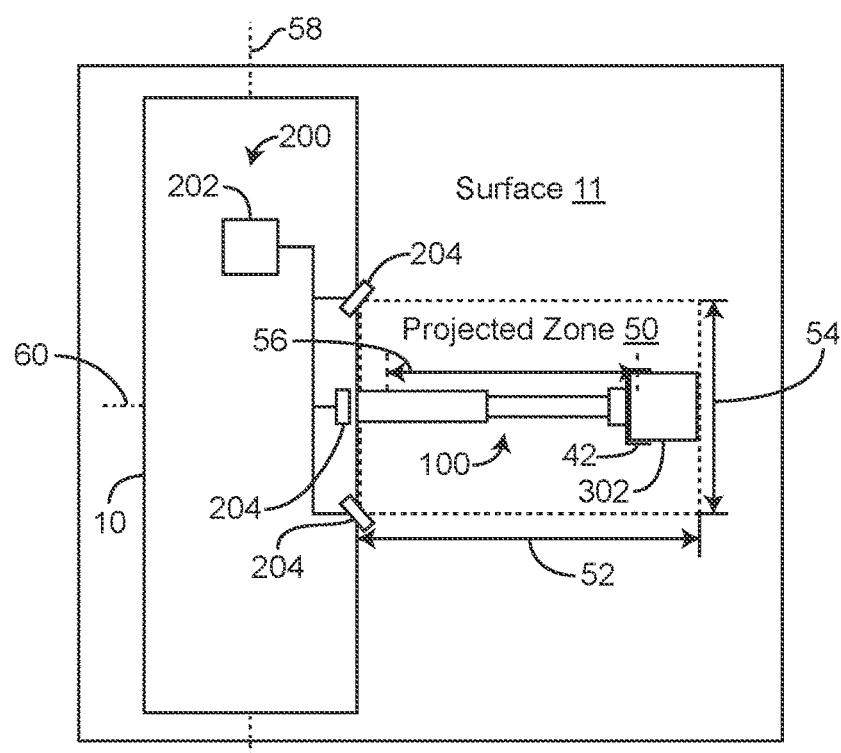
FIG. 3 is a top view of the refuse vehicle of FIG. 1, showing a projection zone displayed on the surface by the projection system, according to an exemplary embodiment.

Referring still to FIG. 1, grabber assembly 42 includes a pair of grabber arms shown as grabber arms 44. Grabber arms 44 are configured to rotate about an axis extending through a bushing. Grabber arms 44 are configured to releasably secure a refuse container to grabber assembly 42, according to an exemplary embodiment. Grabber arms 44 rotate about the axis extending through the bushing to transition between an engaged state (e.g., a fully grasped configuration, a fully grasped state, a partially grasped configuration, a partially grasped state) and a disengaged state (e.g., a fully open state/configuration, a fully released state/configuration, a partially open state/configuration, a partially released state/configuration). In the engaged state, grabber arms 44 are rotated towards each other such that the refuse container is grasped therebetween. In the disengaged state, grabber arms 44 rotate outwards (as shown in FIG. 3) such that the refuse container is not grasped therebetween. By transitioning between the engaged state and the disengaged state, grabber assembly 42 releasably couples the refuse container with grabber assembly 42. Refuse vehicle 10 may pull up along-side the refuse container, such that the refuse container is positioned to be grasped by the grabber assembly 42 therebetween. Grabber assembly 42 may then transition into an engaged state to grasp the refuse container. After the refuse container has been securely grasped, grabber assembly 42 may be transported along track 20 with the refuse container. When grabber assembly 42 reaches the end of track 20, grabber assembly 42 may tilt and empty the contents of the refuse container in refuse compartment 30. The tilting is facilitated by the path of track 20. When the contents of the refuse container have been emptied into refuse compartment 30, grabber assembly 42 may descend along track 20, and return the refuse container to the ground. Once the refuse container has been placed on the ground, the grabber assembly may transition into the disengaged state, releasing the refuse container.

Projection System

Referring still to FIG. 1, refuse vehicle 10 includes a projection system, a conspicuity system, an alert system, an alarm system, a display system, etc., shown as projection system 200. Projection system 200 includes a controller 202 and one or more projection devices, light emitting devices, light emitting diodes, sensors, projectors, etc., shown as projectors 204. Projectors 204 are configured to project, display, or provide an image, a light, a projection, etc., onto a surface 11 (e.g., a ground surface, a road, a curb, etc.) that is proximate, nearby, neighboring, etc., refuse vehicle 10. Projection system 200 can also include one or more input devices, image capture devices, imaging devices, etc., shown as cameras 208. Cameras 208 may be positioned about body 14 and oriented or directed outwards so cameras 208 are configured to capture image data, video feed, etc., of areas, zones, spaces, etc., surrounding refuse vehicle 10. In some embodiments, cameras 208 are positioned proximate or nearby various controllable elements, apparatuses, automated features, arms, etc., of refuse vehicle 10 (e.g., lift assembly 100). For example, camera 208 may be positioned nearby lift assembly 100 so as to capture image data, video feed, video data, etc., of lift assembly 100 and areas, zones, curbside areas, etc., surrounding or proximate lift assembly 100.

Figure 2:
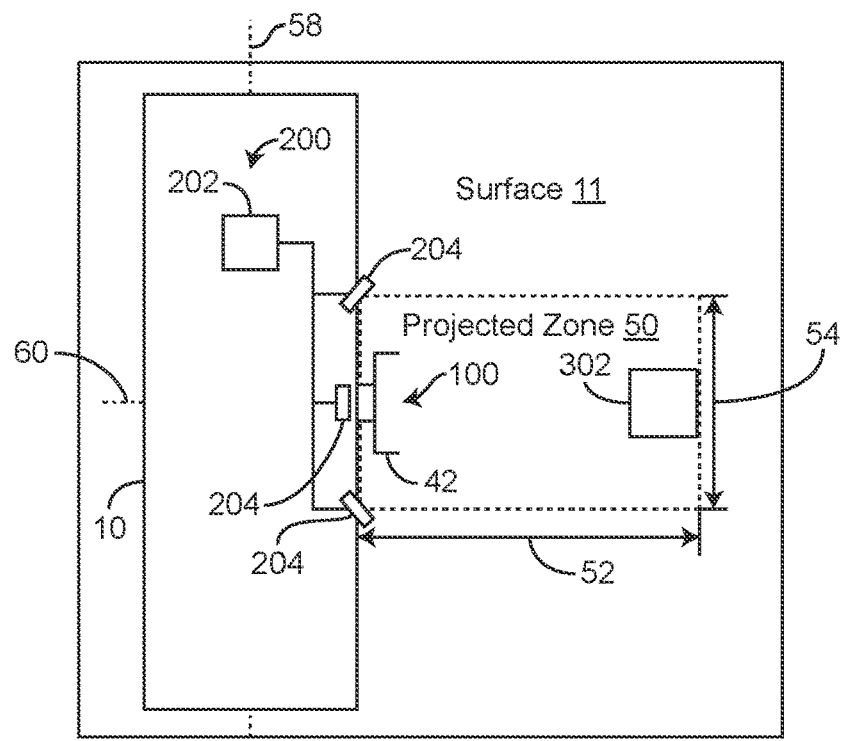
FIG. 2 is a top view of the refuse vehicle of FIG. 1, showing a projection zone displayed on a surface by the projection system, according to an exemplary embodiment.

Referring particularly to FIGS. 2-3, projectors 204 are configured to output, provide, project, etc., a projected zone 50 (e.g., an operating zone, an area, a zone, a space, a perimeter, etc.) onto surface 11. In some embodiments, multiple projectors 204 operate cooperatively to project or display projected zone 50 on surface 11. In some embodiments, a single one of projectors 204 operates to project or display projected zone 50 onto surface 11. Projected zone 50 can be associated with a corresponding apparatus, arm, device, element, system, etc., of refuse vehicle 10. Projected zone 50 can be configured to increase a visibility or conspicuity of the corresponding apparatus of refuse vehicle 10 (e.g., the lift assembly 100). In some embodiments, projected zone 50 is a visual indication of an area, zone, work zone, etc., within which or across which the corresponding apparatus may move, translate, pivot, or otherwise operate (e.g., lift assembly 100). Projectors 204 can be fixedly coupled, rotatably coupled, mounted, secured, etc., with refuse vehicle 10 (e.g., body 14, cab 16, frame 12, etc.), a portion of lift assembly 100, grabber assembly 42, etc., or any combination thereof.

Projected zone 50 can be or include an image, textual information, visual information, different lights, different colored lights, etc., that spatially vary across an area of projected zone 50. For example, projected zone 50 may include an indication of a path of travel of a corresponding automated apparatus of the refuse vehicle 10 (e.g., the lift assembly 100). In some embodiments, projected zone 50 includes one or more sub-zones (e.g., different colored lighting or projection, different image data, etc.). In some embodiments, projected zone 50 includes different colors (e.g., a gradient of different colors), different image data, different textual data, different boundaries or lines, etc., indicating different levels of alert or to provide different levels of conspicuity.

As shown in FIGS. 2-3, projector(s) 204 may operate to provide projected zone 50 for lift assembly 100. Lift assembly 100 may extend a distance 56 between a retracted position as shown in FIG. 2 and an extended position as shown in FIG. 3. In some embodiments, lift assembly 100 extends or retracts from a lateral side of refuse vehicle 10 (e.g., a curb-side of refuse vehicle 10). In some embodiments, lift assembly 100 extends or retracts from a front or rear end or front or rear side of refuse vehicle 10. Grabber assembly 42 is positioned at an end of lift assembly 100 and can be configured to releasably grasp a refuse collection bin 302 when lift assembly 100 is at the position shown in FIG. 3 (e.g., a fully extended position) or when lift assembly 100 is at a position between the position shown in FIG. 2 and the position shown in FIG. 3 (e.g., a partially extended or a partially retracted position). In some embodiments, projected zone 50 has a size such that lift assembly 100 is within projected zone 50 when lift assembly 100 operates between the position shown in FIG. 2 and the position shown in FIG. 3.

Projected zone 50 may be a rectangular shape (as shown in FIGS. 2-3), a circular shape, an irregular shape, a hexagonal shape, etc. In some embodiments, projected zone 50 is generated by projector(s) 204 that a nearby person is visually informed regarding an area that lift assembly 100 operates across. For example, projected zone 50 may be a red color, a warning color, an image, include textual information, etc., or any combination thereof, notifying a nearby individual that projected zone 50 should not be entered. In some embodiments, projected zone 50 is projected in a lateral direction 60 (e.g., from a lateral side of refuse vehicle 10) or in a longitudinal direction 58 (e.g., in front of or behind refuse vehicle 10). Projected zone 50 may have a lateral distance 52 and a longitudinal distance 54. In some embodiments, lateral distance 52 and longitudinal distance 54 define different sides of projected zone 50. It should be understood that while projected zone 50 is shown having a rectangular shape, projected zone may have any shape, including curved peripheries, feathered edges, etc.

Projected zone 50 may be initially displayed, projected onto surface 11, output, etc., by projectors 204 prior to operation of the corresponding apparatus, device, system, assembly, etc. (e.g., lift assembly 100 as shown in FIGS. 2-3). For example, controller 202 may operate projectors 204 to display, output, project, or otherwise display projected zone 50 onto surface 11 prior to operation of lift assembly 100 so that nearby individuals are notified regarding operation of lift assembly 100 and are prompted to exit projected zone 50. Advantageously, using projected zone 50 may increase a conspicuity of lift assembly 100 and can facilitate visually notifying nearby individuals to move a safe distance from refuse vehicle 10 so that the individuals do not impede or hinder the operation of the lift assembly 100.

Lift assembly 100 can include telescoping arms or an extension mechanism that extends and retracts from the position shown in FIG. 2 to the position shown in FIG. 3. Once lift assembly 100 extends to the position shown in FIG. 3, grabber assembly 42 can operate to grasp refuse collection bin 302. After grabber assembly 42 grasps refuse collection bin 302, lift assembly 100 may retract to the position shown in FIG. 2 and lift and empty refuse collection bin 302 into body 14 or a hopper of refuse vehicle 10. Advantageously, projected zone 50 can facilitate notifying an operator of refuse vehicle 10 regarding whether refuse vehicle 10 is sufficiently close to refuse collection bin 302 so that grabber assembly 42 is extendable to grasp refuse collection bin 302.

Control Diagram

Figure 4:
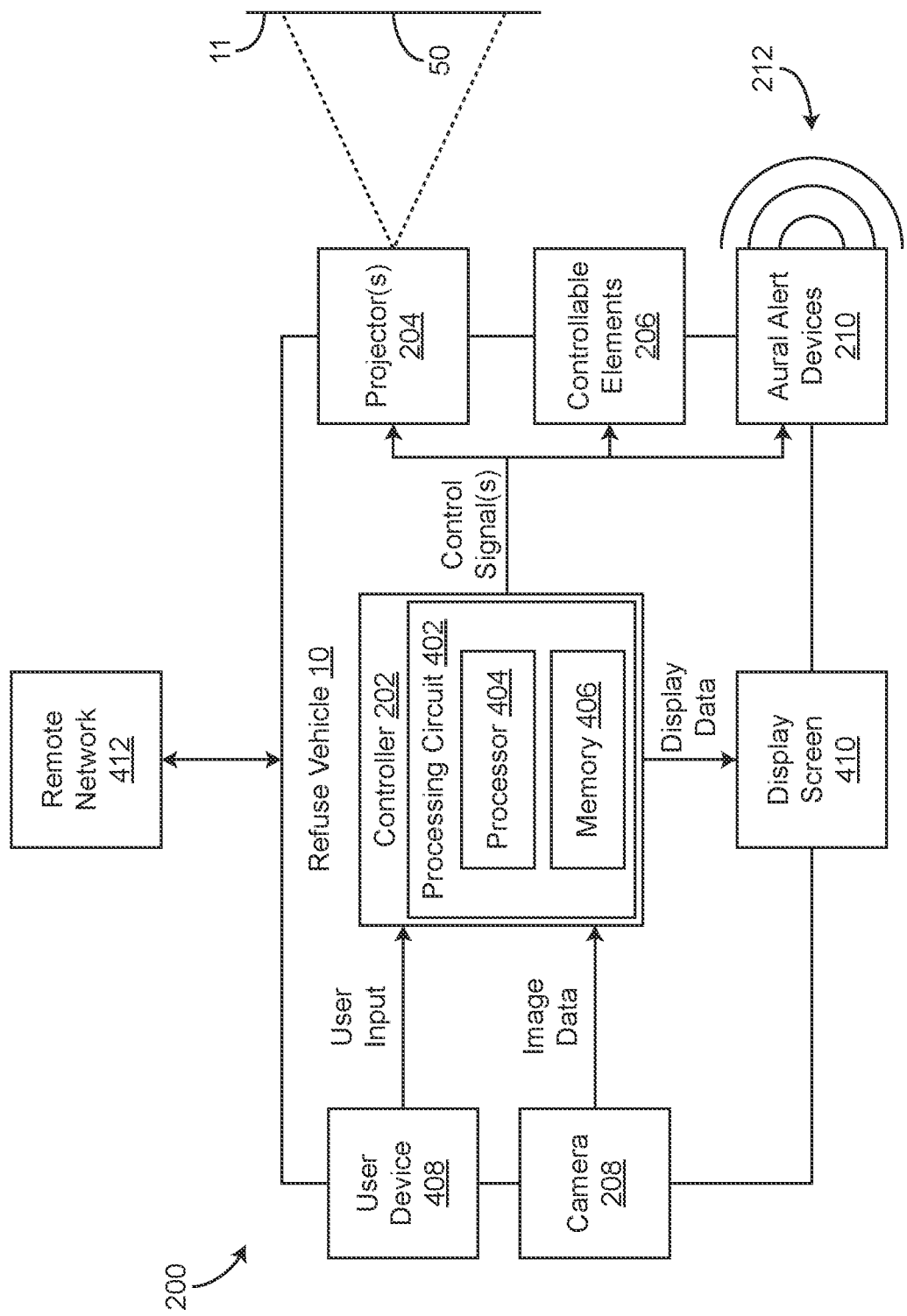
FIG. 4 is a block diagram of the projection system of the refuse vehicle of FIG. 1, according to an exemplary embodiment.

Referring particularly to FIG. 4, projection system 200 is shown in greater detail, according to an exemplary embodiment. Projection system 200 includes controller 202, projector(s) 204, one or more controllable elements 206 of refuse vehicle 10 (e.g., electric motors, pneumatic cylinders, hydraulic cylinders, engines, valves, actuators, linear electric actuators, etc.), camera(s) 208, and a user device 408 (e.g., a user interface).

Controller 202 is configured to receive a user input from user device 408 and image data from camera(s) 208. In some embodiments, the image data is video feed data obtained from camera(s) 208 regarding one or more areas surrounding refuse vehicle 10. For example, the image data may be or include video feed data (e.g., live or real-time video feed data) of an area, zone, side, etc., of refuse vehicle 10 where projected zone 50 will be displayed.

Controller 202 includes a processing circuit 402, a processor 404, and memory 406. Processing circuit 402 can be communicably connected to a communications interface such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

In some embodiments, user device 408 is positioned within cab 16 of refuse vehicle 10. For example, user device 408 can be a human machine interface (HMI) that includes various buttons, switches, levers, dials, joysticks, etc., for operation of refuse vehicle 10. In some embodiments, user device 408 is configured to receive the user input and provide a signal to controller 202 that indicates a desired operation of refuse vehicle 10 or of an apparatus, system, device, sub-system, assembly, etc., of refuse vehicle 10. For example, the user input or the signal may indicate a requested operation of lift assembly 100 or grabber assembly 42.

In some embodiments, controller 202 is configured to generate control signal(s) for controllable elements 206 of refuse vehicle 10 or the various apparatuses, sub-assemblies, sub-apparatuses, systems, devices, assemblies, etc., of refuse vehicle 10 (e.g., lift assembly 100). In some embodiments, controller 202 generates control signal(s) for controllable elements 206 based on the user input provided by user device 408 so that the apparatuses of refuse vehicle 10 operate to perform the requested operation. For example, the user input may indicate a request to extend or retract lift assembly 100 (e.g., translate grabber assembly 42) so that grabber assembly 42 grasps refuse collection bin 302 and then operates to empty contents of refuse collection bin 302 into body 14 of refuse vehicle 10 or a compartment of refuse vehicle 10.

Controller 202 is also configured to generate and provide control signals for projector(s) 204 so that projector(s) 204 operate to display, provide, output, etc., projected zone 50 onto surface 11. In some embodiments, controller 202 is configured to operate projector(s) 204 to initiate projection of projected zone 50 when controller 202 receives the user input from user device 408. In some embodiments, controller 202 operates a corresponding set of projector(s) 204 of refuse vehicle 10 to project a corresponding projected zone 50 onto surface 11 for the apparatus, assembly, system, sub-system, etc., that the user input corresponds. For example, if refuse vehicle 10 includes a first lift or loading apparatus and a second lift or loading apparatus, and an operator provides a user input to user device 408 to operate the first lift or loading apparatus, controller 202 may operate a corresponding one or a corresponding set of projector(s) 204 to display a projected zone 50 for the first lift or loading apparatus. In some embodiments, after receiving the user input to operate an apparatus of refuse vehicle 10, controller 202 automatically operates projector(s) 204 to provide the projected zone 50 for a predetermined amount of time before initiating a requested operation of the apparatus.

In some embodiments, the user input is a request to initiate projection of projected zone 50 onto surface 11. For example, an operator may operate user device 408 to provide a user input to controller 202 to initiate projection of projected zone 50 (e.g., a projected image) by projector(s) 204. In some embodiments, the operator may then operate user device 408 so that an associated or corresponding apparatus (e.g., lift assembly 100, a reach apparatus, a grabber apparatus, a loading apparatus, etc.) is operated. In some embodiments, controller 202 restricts operation of the apparatus of refuse vehicle 10 (e.g., lift assembly 100) if the corresponding projector 204 or projector(s) 204 are not displaying or outputting the projected zone 50. In some embodiments, controller 202 restricts, limits, or prevents operation of the apparatus of refuse vehicle 10 (e.g., lift assembly 100) in response to a determination that an individual, object, etc., is present in the projected zone 50 (e.g., a determination performed by the controller 202 using the image data obtained from camera 208 and an image analysis technique).

In some embodiments, controller 202 is configured to generate a digital, virtual, or simulated image of projected zone 50 for display on display screen 410. For example, controller 202 can generate a virtual image of projected zone 50 in addition to or in place of projected zone 50. Controller 202 can receive the image data from camera 208 and combine, overlay, composite, etc., the virtual or digital image of projected zone 50 onto the image data. The virtual image or the digital image may be the same as or similar to (e.g., resemble) projected zone 50 that is displayed on ground surface 11 by projector(s) 11. In some embodiments, the virtual or digital image is overlaid or combined with the image data in real-time. Controller 202 may perform an image rendering technique to generate the virtual or digital image of projected zone 50 and combine the virtual or digital image with the image data. The combined image data can be output to display screen 410 as display data. Display screen 410 may be positioned anywhere on refuse vehicle 10 (e.g., within cab 16) so that an operator may view display screen 410 and be provided a visual representation of projected zone 50. This can facilitate notifying the operator regarding whether objects or persons are within the projected zone 50 as displayed on display screen 410.

Referring still to FIG. 4, projection system 200 or refuse vehicle 10 can include one or more aural alert devices 210 (e.g., speakers, sound output devices, alarms, buzzers, etc.). In some embodiments, aural alert devices 210 are associated with a corresponding projected zone 50. For example, when projector(s) 204 operate to display projected zone 50, aural alert devices 210 can operate to provide an aural alert 212 to a nearby individual. In some embodiments, when controllable elements 206 or the corresponding apparatus of projected zone 50 operate to perform a requested function (e.g., loading a refuse collection bin, extending a reach assembly of the refuse vehicle 10, etc.), aural alert devices 210 may be operated by controller 202 to provide the aural alert 212. In this way, controller 202 can operate aural alert devices 210 to provide an aural alert to nearby individuals to warn the nearby individuals to exit projected zone 50 or to provide clearance for operation of the corresponding apparatus of refuse vehicle 10. In some embodiments, controller 202 operates aural alert devices 210 automatically in response to receiving the user input or a request to perform a function with one of the apparatuses or controllable elements 206 of refuse vehicle 10. Likewise, controller 202 may operate aural alert devices 210 in response to receiving a specific user input from user device 408 that indicates an operator desires aural alert devices 210 to provide the aural alert 212 for a corresponding one or more projected zones 50 or apparatuses of refuse vehicle 10.

Referring still to FIG. 4, projection system 200 can include a remote network 412 with which controller 202 is configured to communicate. In some embodiments, controller 202 is configured to wirelessly communicate with remote network 412. In some embodiments, any user inputs, image data, sensor data, display data, control signals, etc., as obtained, determined, generated, output, etc., by controller 202 are provided to remote network 412. In some embodiments, remote network 412 includes a processing circuit or processing circuitry similar to processing circuit 402 of controller 202 so that remote network 412 can be configured to perform any of the functionality (e.g., the image processing techniques) of controller 202. In this way, the functionality of controller 202 as described herein may be performed locally at controller 202 of refuse vehicle 10, remotely by remote network 412, or distributed across controller 202 and remote network 412 so that some of the functionality as described herein is performed locally at refuse vehicle 10 while other of the functionality as described herein is performed remotely at remote network 412.

Multiple Projection Zones

Figure 5:
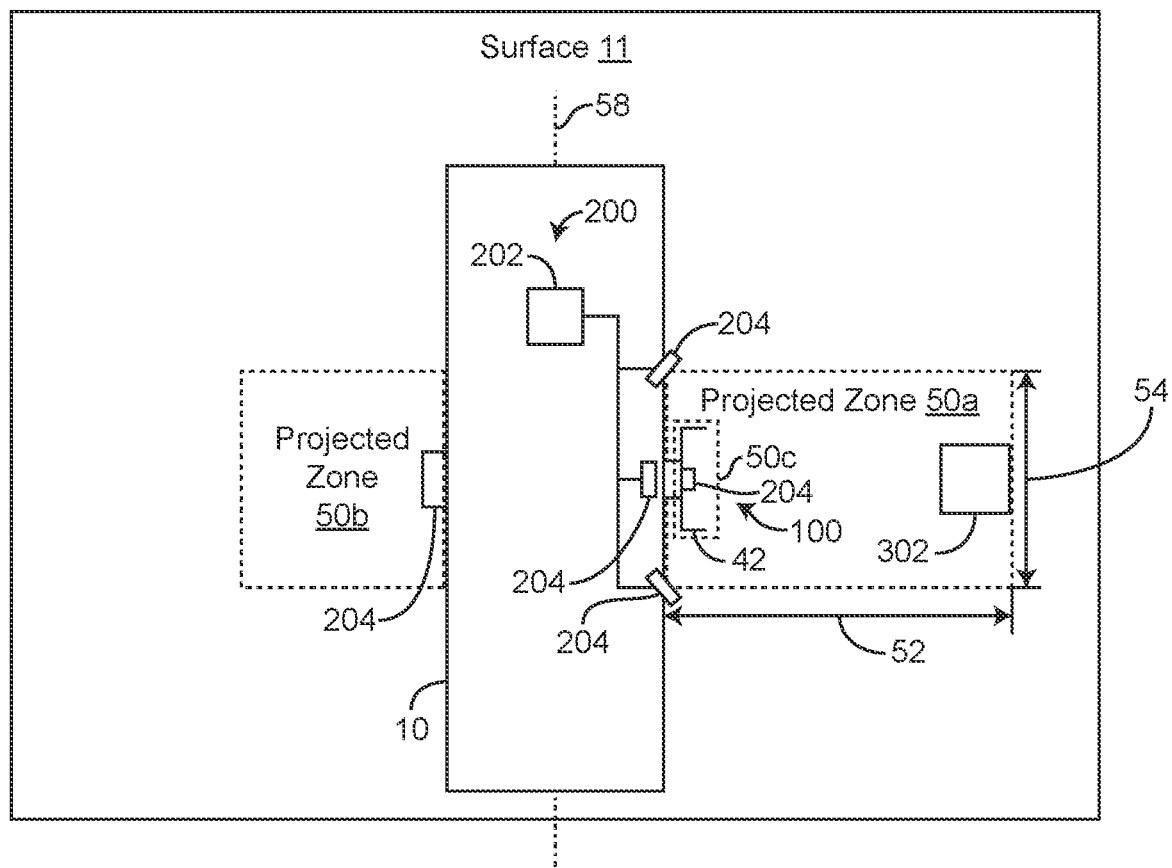
FIG. 5 is a top view of the refuse vehicle of FIG. 1, showing multiple projection zones displayed on the surface by the projection system, according to an exemplary embodiment.
Figure 6:
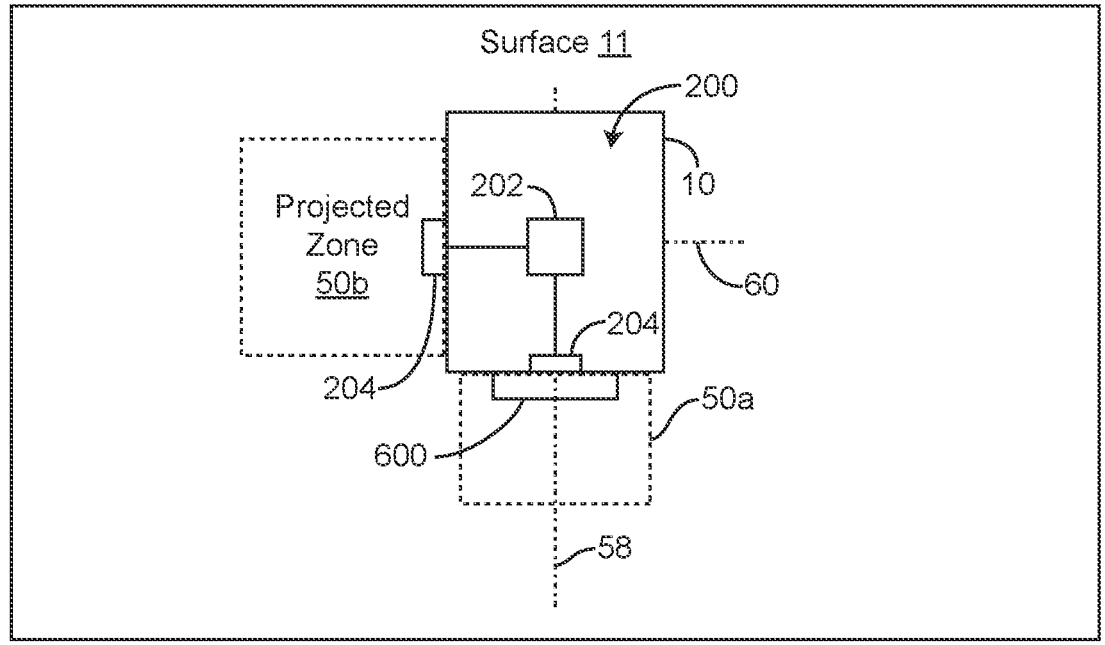
FIG. 6 is a top view of the refuse vehicle of FIG. 1, showing multiple projection zones displayed on the surface by the projection system, according to an exemplary embodiment.

Referring particularly to FIGS. 5-6, projection system 200 can be configured to output, display, project, etc., multiple projected zones 50. As shown in FIG. 5, projection system 200 can display a first projected zone 50a on ground surface 11 at a first lateral side of refuse vehicle 10 and a second projected zone 50b on ground surface 11 at a second lateral side of refuse vehicle 10. The first projected zone 50a may correspond to a first apparatus (e.g., lift assembly 100), while the second projected zone 50b can correspond to a second apparatus (e.g., a loading assembly, a grabber arm, etc.) on the opposite lateral side of refuse vehicle 10.

Referring still to FIG. 5, various projectors 204 can be configured to provide, output, display, etc., a projected zone 50c within projected zone 50a. For example, grabber assembly 42 may include a corresponding projector 204 that is configured to provide projected zone 50c onto ground surface 11. In some embodiments, projected zone 50c is a sub-zone that is overlaid onto ground surface 11 within projected zone 50a. Projector 204 can be fixedly coupled with grabber assembly 42 so that as lift assembly 100 operates between the extended position (shown in FIG. 3) and the retracted position (shown in FIG. 2), projected zone 50c moves with projected zone 50a.

Referring particularly to FIG. 6, projection system 200 can include projector(s) 204 configured to output, provide, project, display, etc., a first projected zone 50a from a longitudinal (e.g., a front or a rear) side of refuse vehicle 10 and a second projected zone 50b from a lateral side of refuse vehicle 10. For example, refuse vehicle 10 may include a rear-loading apparatus 600 that is configured to removably couple with a refuse collection bin, lift, and empty contents of the refuse collection bin into body 14 of refuse vehicle 10 or into a hopper or compartment of refuse vehicle 10 for further processing (e.g., compaction). As shown in FIG. 6, projection system 200 may include projectors 204 positioned or configured to provide a projected zone 50 on a longitudinal side (e.g., a front or a rear) of refuse vehicle 10.

Process

Figure 7:
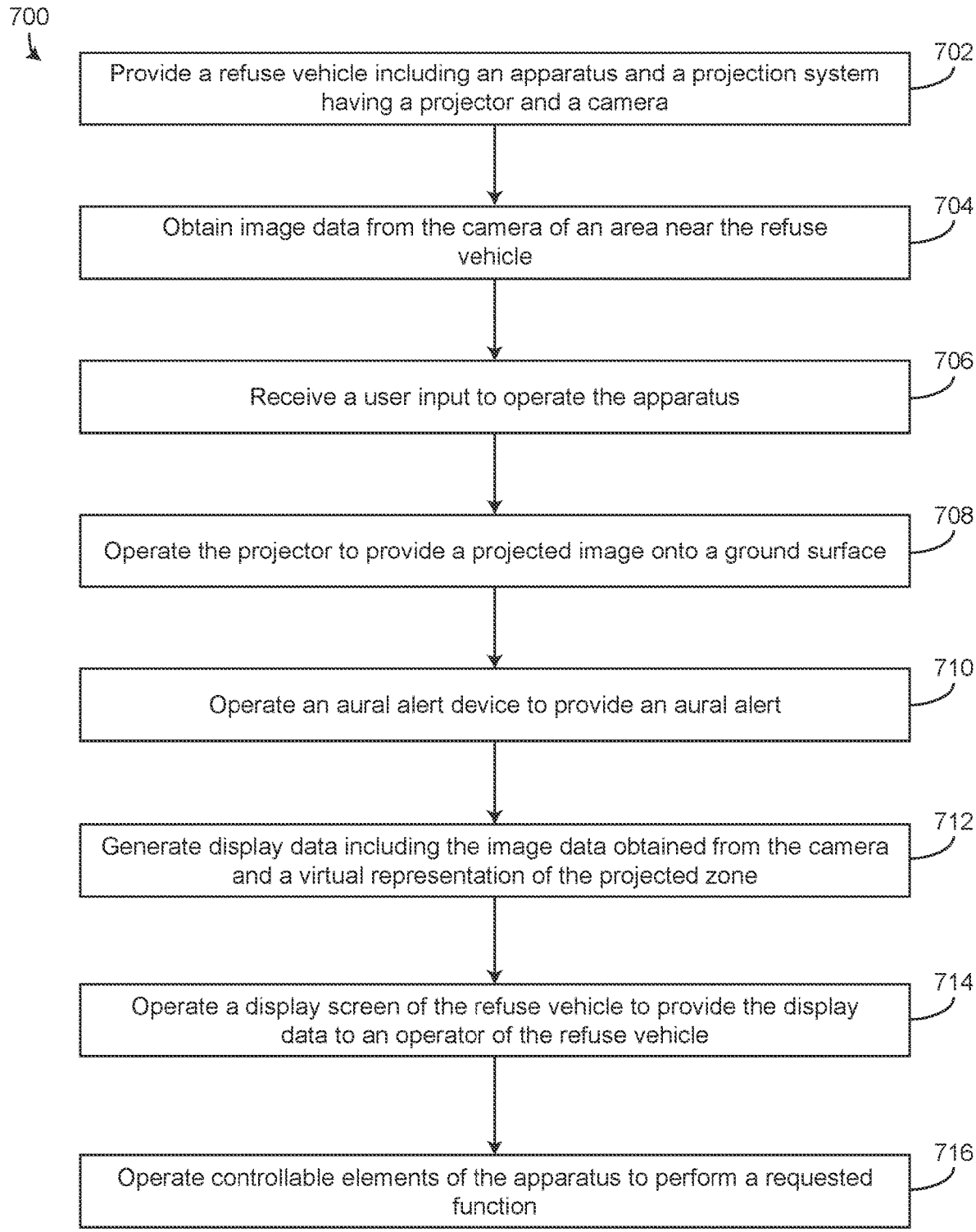
FIG. 7 is a flow diagram of a process for providing projected imagery onto a ground surface, according to an exemplary embodiment.

Referring particularly to FIG. 7, a process 700 for providing a projected zone or area surrounding, proximate, or near a refuse vehicle to alert nearby individuals is shown. In some embodiments, process 700 is for increasing a visibility or conspicuity of an automated apparatus (e.g., an automated collection arm of a refuse vehicle). Process 700 includes steps 702-716 and can be performed by projection system 200. In some embodiments, process 700 is also at least partially performed by refuse vehicle 10.

Process 700 includes providing a refuse vehicle including an apparatus and a projection system having a projector, an apparatus, and a camera (step 702), according to some embodiments. In some embodiments, the apparatus is a loading apparatus, an articulated arm, a front loading apparatus, a rear loading apparatus, etc., of the refuse vehicle. For example, the apparatus may be lift assembly 100 of refuse vehicle 10. The refuse vehicle may be a side loading, a front loading, or a rear loading refuse vehicle. In some embodiments, the refuse vehicle is refuse vehicle 10 and includes lift assembly 100 and grabber assembly 42. The apparatus can be configured to rotate, pivot, extend, retract, articulate, etc., a distance from the refuse vehicle and may be transitionable between various positions. For example, the apparatus may be a front-loading apparatus, a side-loading apparatus, a rear-loading apparatus, etc. The camera (e.g., camera 208) can be positioned and oriented or otherwise configured to obtain image data regarding an area or zone proximate the apparatus. For example, the camera can be configured to obtain image data of a zone across or through which the apparatus operates. The projector can be positioned and/or oriented, or otherwise configured to display, project, or otherwise output a projection to a ground surface for the apparatus or to increase conspicuity of an area that the apparatus operates, moves, translates, extends, etc., across.

Process 700 includes obtaining image data from the camera of an area near the refuse vehicle (step 704), according to some embodiments. In some embodiments, the image data is obtained from the camera of an area or zone across which the apparatus operates or will operate. In some embodiments, multiple cameras are configured to obtain different perspective views of the area. The image data may be provided to a controller of the projection system. In some embodiments, step 704 is performed by camera 208 and controller 202.

Process 700 includes receiving a user input to operate the apparatus (step 706), according to some embodiments. In some embodiments, step 706 is performed by user device 408 and controller 202. For example, step 706 can include providing a request to operate a specific apparatus of the refuse vehicle. The user input can be received through an HMI, a user device, etc. (e.g., located in a cab of the refuse vehicle).

Process 700 includes operating the projector to provide a projected image onto the ground surface (step 708), according to some embodiments. In some embodiments, the projected image is provided onto the ground surface near the apparatus. For example, the projected image may be displayed on the ground surface to alert or notify nearby individuals of an amount of space that the apparatus requires to operate. If the apparatus swings, moves, translates, extends, etc., along a path that extends spatially a distance away from the refuse vehicle, the projected zone may cover the path. In some embodiments, the projected zone facilitates increased conspicuity or visual notification regarding an amount of space or area that the apparatus requires to operate properly. Step 708 can be performed by projector 204 and controller 202.

Process 700 includes operating an aural alert device to provide an aural alert (step 710), according to some embodiments. In some embodiments, the aural alert device is a speaker or sound producing device of the refuse vehicle. The aural alert device can be aural alert device 210 and may be configured to provide aural alert 212 to a nearby individual. Step 710 can be performed by controller 202 and aural alert device 210.

Process 700 includes generating display data including the image data obtained from the camera and a virtual representation of the projected zone (step 712), according to some embodiments. In some embodiments, step 712 is performed by controller 202. Controller 202 may generate a virtual representation or a digital image of the projected zone and superimpose or composite the virtual representation or the digital image of the projected zone onto the image data obtained by the camera in step 704. In some embodiments, step 712 is optional.

Process 700 includes operating a display screen of the refuse vehicle to provide the display data to an operator of the refuse vehicle (step 714), according to some embodiments. Step 714 can be performed by controller 202 and display screen 410. In some embodiments, step 714 includes providing the display data generated in step 712 to the display screen 410 so that the display screen operates to provide the display data to the operator of the refuse vehicle. The display screen may be positioned within a cab of the refuse vehicle and can facilitate providing a visual indication of whether or not objects, people, etc., are within the projected zone as represented by the virtual representation.

Process 700 includes operating one or more controllable elements of the apparatus of the refuse vehicle to perform a requested function (step 716), according to some embodiments. Step 716 can include generating control signals for the controllable elements (e.g., actuators, electric motors, pumps, etc.) and providing the control signals to the controllable elements. Step 716 can be performed by controller 202 by providing generated control signals to controllable elements 206.

Alternative Implementations

Figure 8:
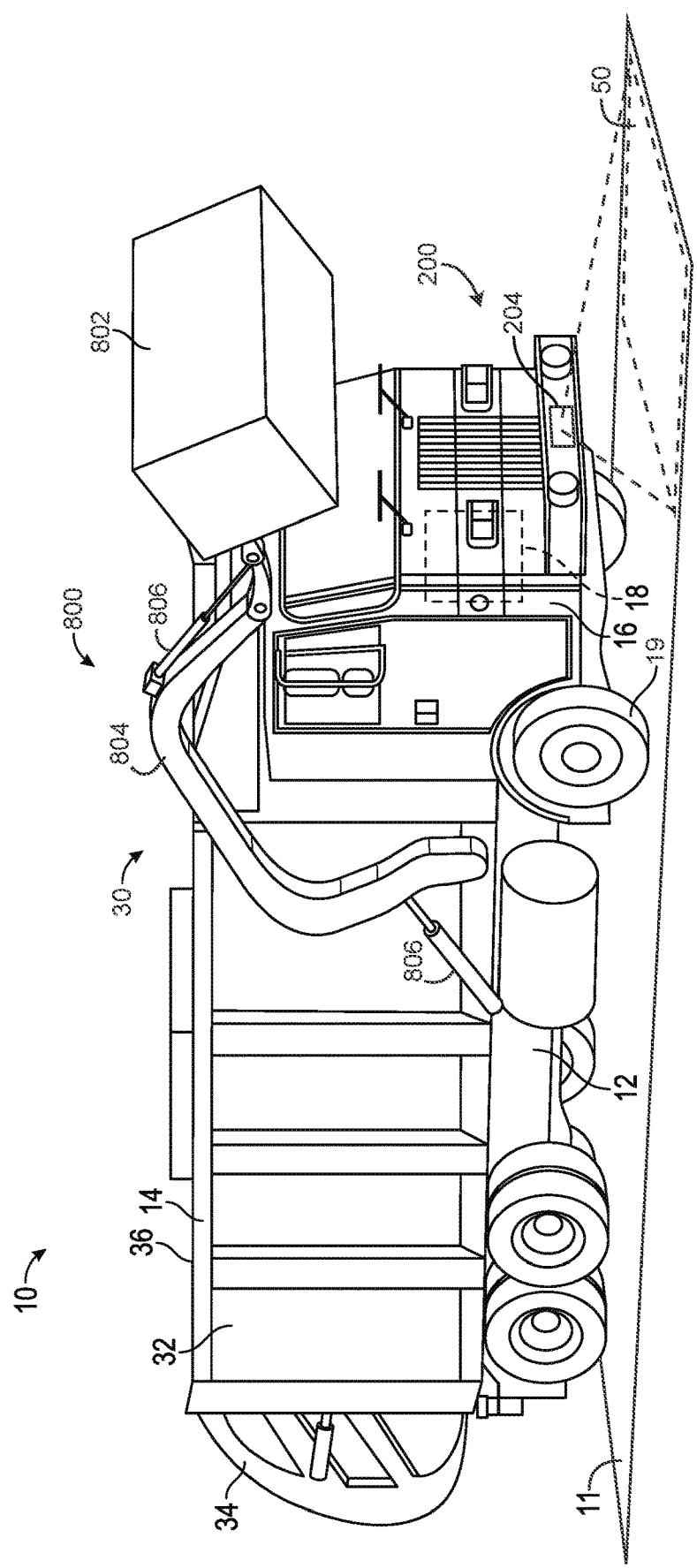
FIG. 8 is a perspective view of a front loading refuse vehicle equipped with the projection system of FIGS. 1-6, according to an exemplary embodiment.
Figure 9:
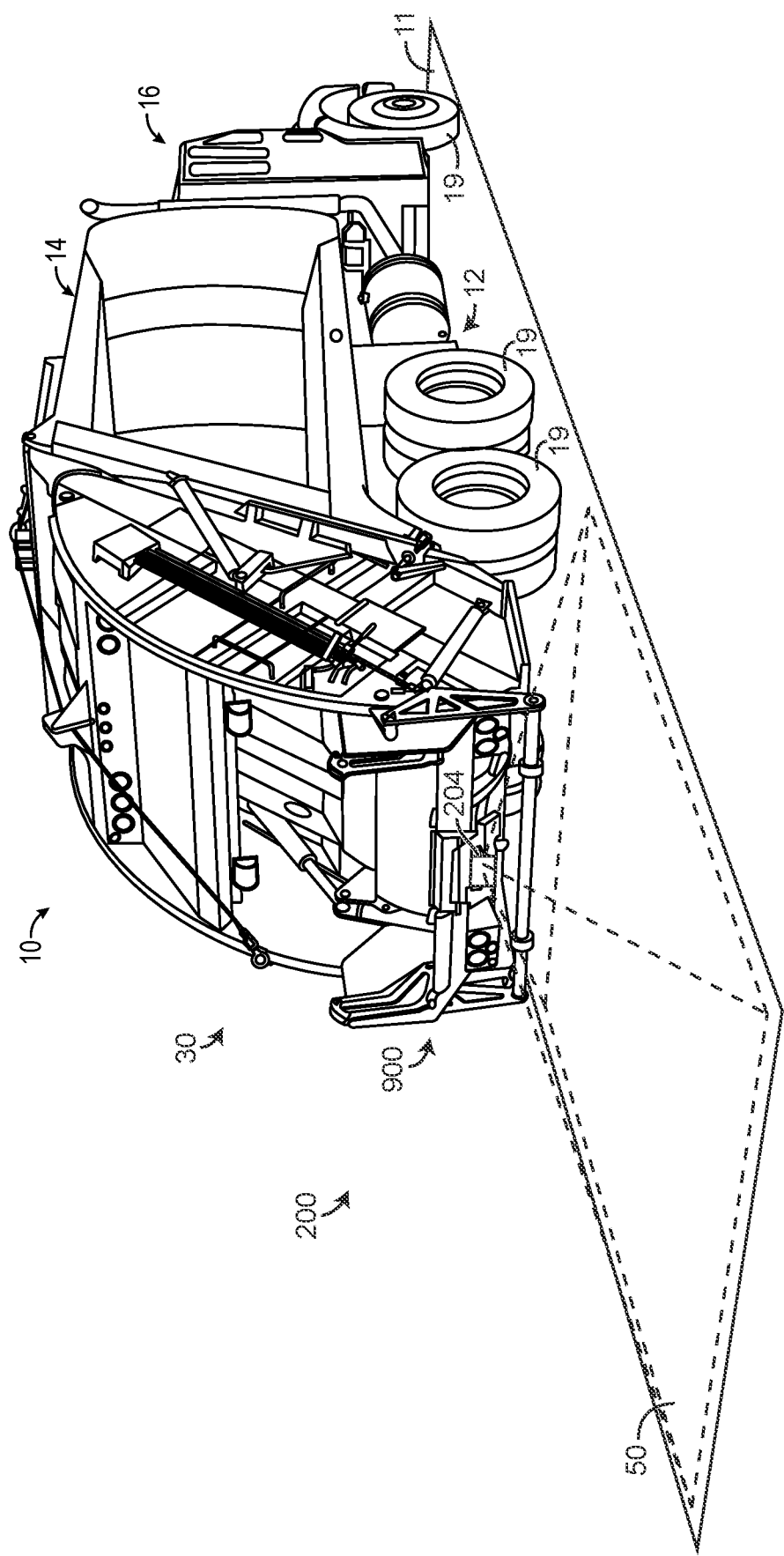
FIG. 9 is a rear perspective view of a read loading refuse vehicle equipped with the projection system of FIGS. 1-6, according to an exemplary embodiment.
Figure 10:
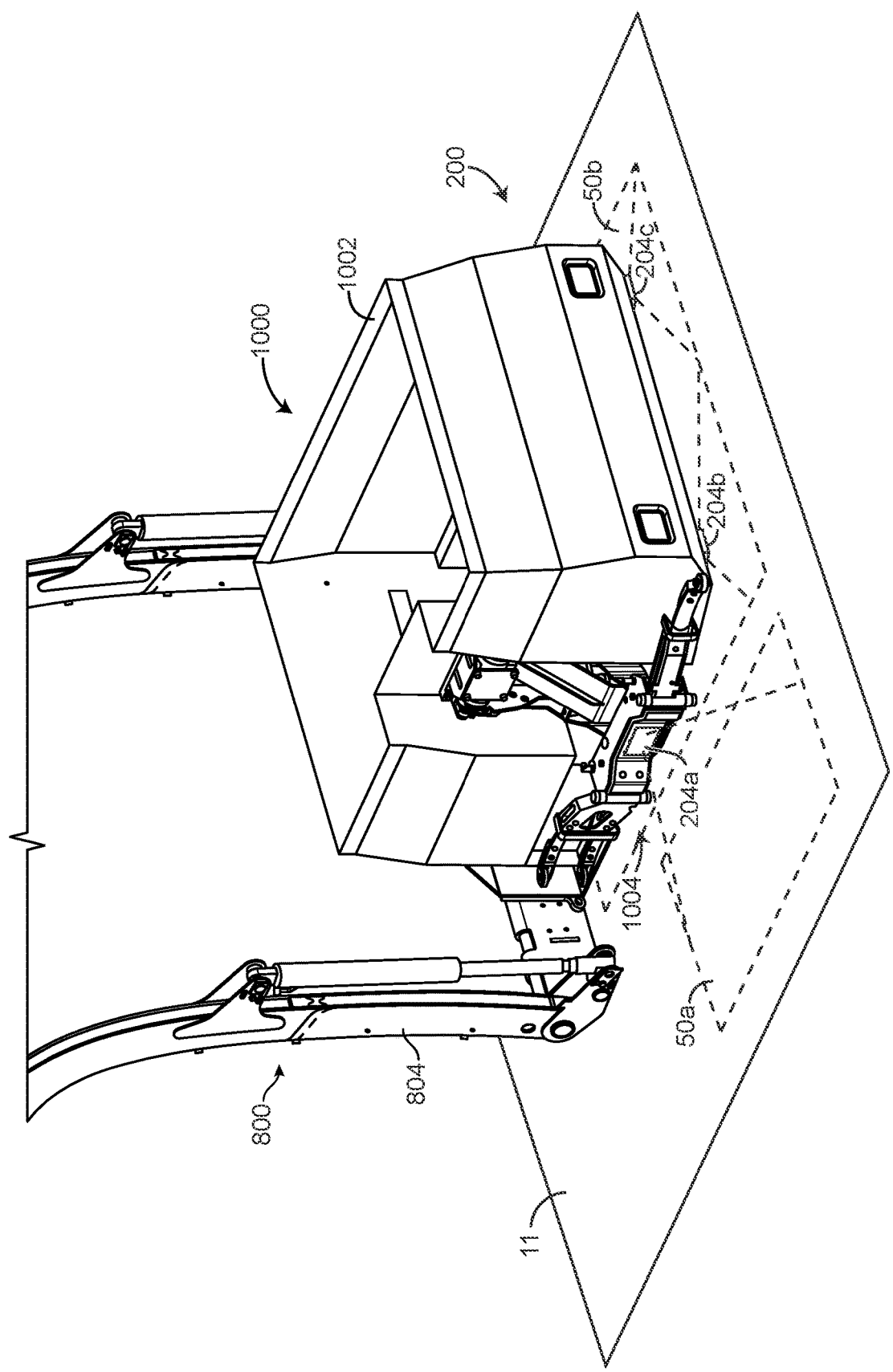
FIG. 10 is a perspective view of a carry can that can be implemented on a front loading refuse vehicle, equipped with the projection system of FIGS. 1-6, according to an exemplary embodiment.

Referring to FIGS. 8-10, the projection system 200 is shown implemented in a front loading refuse vehicle 10 (shown in FIG. 8), a rear loading refuse vehicle 10 (shown in FIG. 9), and a carry can assembly 1000 (e.g., for a front loading refuse vehicle such as shown in FIG. 8).

Referring particularly to FIG. 8, when the projection system 200 is implemented on the front loading refuse vehicle 10, one or more projectors 204 can be positioned on a front position (e.g., a front bumper, a front frame member, etc.) to provide the projected zone 50 onto the ground surface 11 in front of the refuse vehicle 10. The refuse vehicle 10 can include a front loading apparatus 800 that includes a pair of arms 804 pivotally coupled with a body or frame of the refuse vehicle 10. The front loading apparatus 800 can be coupled with a container 802 for emptying refuse into the refuse compartment 30. The front loading apparatus 800 can be driven to operate by one or more actuators 806 (e.g., pneumatic cylinders, hydraulic cylinders, linear electric actuators, etc.). The projection system 200 operates to provide the projected zone 50 onto the ground surface 11 in front of the refuse vehicle 10 to increase conspicuity or visibility of the front loading apparatus 800 to visually notify nearby individuals regarding a spatial area or range throughout which the front loading apparatus 800 operates.

Referring particularly to FIG. 9, the projection system 200 is shown implemented in a rear loading refuse vehicle 10. The rear loading refuse vehicle 10 can include a rear loading apparatus 900 for lifting and emptying containers into the refuse compartment 30. Refuse vehicle 10 can include one or more of the projectors 204 positioned along a rear portion (e.g., a rear bumper, a rear frame member, etc.) of the refuse vehicle 10 to provide the projected zone 50 onto the ground surface 11 at a rearwards (e.g., a longitudinally rearwards) position relative to the refuse vehicle 10. The projection zone 50 can increase a conspicuity or visibility of the rear loading apparatus 900.

Referring particularly to FIG. 10, the projection system 200 is shown implemented in a carry can apparatus 1000 for a front loading refuse vehicle. The carry can apparatus 1000 can be implemented, for example, on the front loading refuse vehicle 10 of FIG. 8. The carry can apparatus 1000 includes a carry can or intermediate container 1002 that is coupled with the arms 804 of the front loading apparatus 800. A grabber arm 1004 is coupled with the intermediate container 1002 for grasping, lifting, and emptying containers of refuse into the intermediate container 1002. The grabber arm 1004 can be the same as or similar to the grabber assembly 42 as described in greater detail above. The projection system 200 can include one or more projectors 204 (shown as projectors 204a, 204b, and 204c) for providing one or more projected zones 50 onto the ground surface 11 proximate the carry can apparatus 1000. In some embodiments, a first projector 204a is configured to provide a first projected zone 50a onto the ground surface 11 proximate the grabber arm 1004 to increase a conspicuity or visibility of the grabber arm 1004. The intermediate container 1002 can also include a projector 204b and a projector 204c that are configured to provide a second projected zone 50b onto the ground surface 11 to increase conspicuity or visibility of the intermediate container 1002.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle comprising:
   an automated apparatus coupled to and extending from the vehicle;
   a projection system comprising a first projector and a second projector, the first projector positioned on the vehicle, wherein the first projector is configured to operate to provide a first projection of visible light onto a ground surface next to the vehicle, the first projection covering a zone within which the automated apparatus moves relative to the vehicle while operating, the second projector coupled with the automated apparatus and configured to provide a second projection of visible light onto a sub-zone of the zone, the second projection corresponding to a current location of the automated apparatus within the first projection and configured to move within the first projection as the automated apparatus moves within the first projection; and
   a control system configured to restrict operation of the automated apparatus to move through the zone responsive to detecting a presence of an obstacle within the first projection.

2. The vehicle of claim 1, wherein the first projection comprises at least one of a light, an image, or textual information.

3. The vehicle of claim 1, wherein the first projection increases a conspicuity or visibility of at least one of the automated apparatus or the zone within which the automated apparatus operates.

4. The vehicle of claim 1, further comprising a user input device, wherein the projection system comprises a controller configured to receive inputs from the user input device and operate the first projector, wherein the controller is configured to receive a user input from the user input device to operate the automated apparatus and operate the projection system to provide the first projection onto the ground surface prior to operation of the automated apparatus.

5. The vehicle of claim 1, wherein the first projector of the projection system is a first of a plurality of first projectors of the projection system, wherein the plurality of first projectors are configured to cooperatively project the first projection onto the ground surface.

6. The vehicle of claim 1, wherein the automated apparatus is a side-loading refuse collection apparatus configured to extend or retract relative to the vehicle.

7. The vehicle of claim 1, wherein the projection system further comprises a camera and the vehicle further comprises a display screen, wherein the camera is configured to obtain image data of a nearby area of at least part of the zone, the ground surface, the automated apparatus, and the first projection when the first projection is provided onto the ground surface, wherein the display screen is configured to display the image data obtained by the camera to an operator of the vehicle.

8. The vehicle of claim 1, wherein the first projection comprises a rectangular shape.

9. A projection system for a vehicle, the projection system comprising:
   a first projector coupled with the vehicle at an automated apparatus of the vehicle and configured to provide a first projection of visible light onto a zone of a ground surface, the automated apparatus configured to move within the first projection relative to the vehicle during operation of the automated apparatus;

a second projector coupled with a grabber assembly of the automated apparatus configured to provide a second projection of visible light onto a sub-zone of the zone, the second projection corresponding to a current location of the grabber assembly within the first projection and configured to move within the first projection as the automated apparatus moves within the first projection; and processing circuitry configured to operate the first projector and the second projector to provide the first projection and the second projection onto the ground surface, wherein the first projection and the second projection are configured to increase a conspicuity or visibility of the zone within which the automated apparatus moves during operation and the sub-zone within which the grabber assembly of the automated apparatus is positioned.

10. The projection system of claim 9, wherein the first projection comprises at least one of a light, image, or textual information.

11. The projection system of claim 9, further comprising a user input device, wherein the projection system comprises a controller configured to receive inputs from the user input device and operate the first projector, wherein the controller is configured to receive a user input from the user input device to operate the automated apparatus and operate the projection system to provide the first projection onto the ground surface prior to operation of the automated apparatus.

12. The projection system of claim 9, wherein the first projector of the projection system is a first of a plurality of first projectors of the projection system, wherein the plurality of first projectors are configured to cooperatively project the first projection onto the ground surface.

13. The projection system of claim 9, wherein the automated apparatus is a side-loading refuse collection apparatus configured to extend or retract relative to the vehicle.

14. The projection system of claim 9, wherein the projection system further comprises a camera and the vehicle further comprises a display screen, wherein the camera is configured to obtain image data of a nearby area of at least part of the zone, the ground surface, the automated apparatus, and the first projection when the first projection is provided onto the ground surface, wherein the display screen is configured to display the image data obtained by the camera to an operator of the vehicle.

15. The projection system of claim 9, further comprising at least one of a speaker or a buzzer, wherein the processing circuitry is configured to operate the speaker or the buzzer to provide an aural alert and the first projector to provide the first projection onto the ground surface to visually and aurally notify a nearby individual regarding operation of the automated apparatus of the vehicle.

16. The projection system of claim 9, wherein the processing circuitry is positioned locally on the vehicle.

17. The projection system of claim 9, wherein the processing circuitry is positioned remotely from the vehicle.

18. The projection system of claim 9, wherein the first projection comprises a rectangular shape.

19. A method for increasing a conspicuity of an operating zone of an automated apparatus of a vehicle, the method comprising:

receiving a user input to operate the automated apparatus such that the automated apparatus moves relative to the vehicle to perform a function;

operating a first projector to provide a first projection of visible light onto a ground surface nearby the vehicle, the first projection covering a zone within which the automated apparatus moves as the automated apparatus performs the function;

operating a second projector coupled with a grabber assembly of the automated apparatus to provide a second projection of visible light onto a sub-zone of the zone, the second projection corresponding to a current location of the grabber assembly within the first projection and configured to move within the first projection as the automated apparatus moves within the first projection; and operating the automated apparatus of the vehicle to move within the zone to perform the function.

20. The method of claim 19, comprising operating the automated apparatus of the vehicle to move within the zone to grasp a waste receptacle.

* * * * *